United States Patent
Borremans

(10) Patent No.: US 9,942,502 B2
(45) Date of Patent: Apr. 10, 2018

(54) IMAGING SENSOR WITH IN-PIXEL AMPLIFICATION

(71) Applicant: IMEC vzw, Leuven (BE)

(72) Inventor: Jonathan Borremans, Lier (BE)

(73) Assignee: IMEC vzw, Leuven (BE)

( * ) Notice: Subject to any disclaimer, the term of this patent is extended or adjusted under 35 U.S.C. 154(b) by 0 days.

(21) Appl. No.: 14/633,552

(22) Filed: Feb. 27, 2015

(65) Prior Publication Data

US 2015/0312502 A1    Oct. 29, 2015

(30) Foreign Application Priority Data

Mar. 25, 2014 (EP) .................................... 14161550

(51) Int. Cl.
| | |
|---|---|
| H04N 5/378 | (2011.01) |
| H04N 5/355 | (2011.01) |
| H04N 5/363 | (2011.01) |
| H04N 5/374 | (2011.01) |
| H04N 5/3745 | (2011.01) |

(52) U.S. Cl.
CPC ............. *H04N 5/378* (2013.01); *H04N 5/355* (2013.01); *H04N 5/363* (2013.01); *H04N 5/3745* (2013.01); *H04N 5/37452* (2013.01)

(58) Field of Classification Search
CPC ........ H04N 5/378; H04N 5/355; H04N 5/363; H04N 5/37452; H04N 5/3745
See application file for complete search history.

(56) References Cited

U.S. PATENT DOCUMENTS

| | | | |
|---|---|---|---|
| 5,923,369 A | 7/1999 | Merril et al. | |
| 6,242,728 B1 | 6/2001 | Merrill et al. | |
| 6,784,931 B1 | 8/2004 | Kudo | |
| 6,784,934 B1 * | 8/2004 | Watanabe ............. | H04N 5/359 |
| | | | 250/208.1 |

(Continued)

FOREIGN PATENT DOCUMENTS

| | | |
|---|---|---|
| EP | 1 229 593 A1 | 8/2002 |
| JP | H1175114 | 3/1999 |

OTHER PUBLICATIONS

European Search Report dated May 21, 2014 for European Patent Application No. EP 14 16 1550.

(Continued)

*Primary Examiner* — Pritham Prabhakher
(74) *Attorney, Agent, or Firm* — Knobbe Martens Olson & Bear LLP

(57) ABSTRACT

A pixel architecture having an in-pixel amplifier comprising an NMOS transistor and a depletion-mode NMOS load is disclosed. In one aspect, the pixel architecture comprises a pixel core including a pixel photodiode for generating an output signal in accordance with incident light. Further, the in-pixel amplifier is connected to a pixel core to amplify the output signal before it is stored in a column buffer before being read out at output of the pixel architecture. By having an in-pixel amplifier that can be used for amplification of the output signal inside the pixel architecture, a larger output value is obtained which may be stored inside the pixel architecture on a small capacitor with improved signal-to-noise performance. This in-pixel amplification can also improve the quality of stored signals for global shutter operation.

11 Claims, 3 Drawing Sheets

(56) References Cited

U.S. PATENT DOCUMENTS

| | | | |
|---|---|---|---|
| 6,974,943 B2 | 12/2005 | Manabe et al. | |
| 6,977,682 B2* | 12/2005 | Mizuno | H04N 5/3575 348/241 |
| 8,203,111 B2* | 6/2012 | Reshef | H01L 27/14609 250/208.1 |
| 8,569,671 B2* | 10/2013 | Meynants | H04N 5/353 250/208.1 |
| 8,884,205 B2* | 11/2014 | Ni | H04N 3/155 250/208.1 |
| 8,987,646 B2* | 3/2015 | De Witt | H04N 5/3575 250/208.1 |
| 9,106,851 B2* | 8/2015 | Fenigstein | H04N 5/355 |
| 2001/0008422 A1* | 7/2001 | Mizuno | H04N 5/3575 348/302 |
| 2006/0081957 A1* | 4/2006 | Itonaga | H01L 27/14609 257/444 |
| 2006/0164107 A1* | 7/2006 | Childs | H04N 3/155 324/678 |
| 2006/0232577 A1 | 10/2006 | Edwards et al. | |
| 2006/0232580 A1* | 10/2006 | Koyama | H04N 3/1568 345/211 |
| 2007/0109433 A1 | 5/2007 | Yamada et al. | |
| 2008/0290253 A1* | 11/2008 | Childs | H04N 5/32 250/208.1 |
| 2009/0128224 A1 | 5/2009 | Toyoshima | |
| 2009/0152446 A1* | 6/2009 | Mizuno | G01J 1/46 250/214 R |
| 2009/0244341 A1* | 10/2009 | Andersson | H04N 5/357 348/294 |
| 2009/0256060 A1* | 10/2009 | Meynants | H04N 5/353 250/208.1 |
| 2010/0108862 A1* | 5/2010 | Mizoguchi | G01J 1/46 250/214 A |
| 2010/0227429 A1 | 9/2010 | Kim et al. | |
| 2011/0025898 A1* | 2/2011 | Ni | H04N 3/155 348/308 |
| 2011/0205416 A1* | 8/2011 | Nishihara | H01L 27/14609 348/300 |
| 2011/0216231 A1* | 9/2011 | Fowler | H04N 5/335 348/294 |
| 2012/0175499 A1* | 7/2012 | Meynants | H04N 5/353 250/208.1 |
| 2014/0027640 A1* | 1/2014 | Yang | H01L 27/14609 250/338.4 |
| 2014/0055653 A1* | 2/2014 | Nishihara | H04N 5/3745 348/300 |
| 2014/0211058 A1* | 7/2014 | Nishihara | H01L 27/14603 348/308 |
| 2014/0263950 A1* | 9/2014 | Fenigstein | H04N 5/355 250/208.1 |

OTHER PUBLICATIONS

Inoue et al., A CMOS Active Pixel Image Sensor with In-pixel CDS for High-Speed Cameras, Jan. 17, 2004, pp. 1-8, 26th International Congress on High-Speed Photography and Photonics.

* cited by examiner

IMAGING SENSOR WITH IN-PIXEL AMPLIFICATION

CROSS-REFERENCE TO RELATED APPLICATION

This application claims foreign priority to European Patent Application No. EP14161550.0, filed Mar. 25, 2014, the contents of which are incorporated by reference herein in its entirety.

BACKGROUND

Technological Field

The present disclosure relates to improvements in or relating to imaging sensors, and is more particularly, although not exclusively, concerned with in-pixel amplification.

Description of the Related Technology

Imaging sensors are implemented using CMOS technology to reduce noise so as to produce a satisfactory resolution of the image being captured in each imaging frame. Generally, a typical imaging sensor comprises an array of pixels, each pixel producing an output signal (or pixel output) corresponding to the light level relating to a particular portion of the image being captured incident on a photodiode of the pixel during an integration period for that photodiode. Pixel outputs must be read out with low noise in order to be able to provide the desired resolution of the overall captured image. Ideally, the pixel output should be amplified as soon as possible. This means that the output should be amplified very close to the pixel, or preferably inside the pixel itself. However, if the pixel is small, there may not be sufficient space to accommodate an amplifier.

When amplifying the pixel output very close to the pixel with a gain greater than one, traditionally NMOS and PMOS devices are used. However, for PMOS devices, an N-well is needed which has the disadvantage that photo-electrons are drawn away from the photodiode within the pixel resulting in degraded quantum efficiency. In addition, the requirement for an N-well also limits the fill factor of the pixel.

Moreover, for global shutter operation in an imaging sensor, all pixel outputs need to be stored at the same time to avoid motion effects from a rolling shutter. Typically, the pixel output must be stored inside the pixel to be able to do this as all pixels in a row in an imaging sensor array cannot be read out at the same time. The pixel may be small, and therefore only a small storage capacitor (capacitor with a low capacitance value) can typically be used inside the pixel itself. Such small storage capacitors generate large kT/C noise (as the capacitance value C is small), resulting in a low pixel output signal and poor signal-to-noise performance.

SUMMARY OF CERTAIN INVENTIVE ASPECTS

It is therefore an object of the present disclosure to provide an in-pixel amplifier that overcomes degraded quantum efficiency and fill factor.

It is another object of the present disclosure to provide an in-pixel amplifier which enables in-pixel storage on a small capacitor whilst providing improved signal-to-noise performance.

In accordance with one aspect of the present disclosure, there is provided a pixel architecture comprising:
 a photodiode element operable for generating a signal; and
 an output for outputting the generated signal;
 characterized in that the pixel architecture further comprises an in-pixel amplifier operable for amplifying the generated signal;
 and in that the in-pixel amplifier comprises at least one depletion-mode device.

By using an in-pixel amplifier which comprises a depletion-mode device, there is no need to use PMOS devices and hence the quantum efficiency reduction associated with the use of PMOS devices for in-pixel amplification is no longer of relevance. In addition, an output signal with good signal-to-noise performance can be provided.

In one embodiment, the at least one depletion-mode device preferably comprises an NMOS amplifier with a depletion-mode NMOS load transistor. In this instance, the depletion-mode NMOS load transistor replaces conventional PMOS devices which reduce the quantum efficiency and limits the fill factor for the pixel architecture.

At least one storage element may be provided connected to the in-pixel amplifier for storing the amplified signal. In one embodiment, a storage element may be provided for storing the amplified signal for each frame, the storage elements being connected in parallel to the in-pixel amplifier and the output.

The pixel architecture may further comprise a column buffer connected to the output, the column buffer including at least one transistor for reading out signals for the output.

The photodiode element forms part of a pixel core, the pixel core including a voltage conversion region, and at least one control transistor, the output from the pixel core forming an input for the in-pixel amplifier. In one embodiment, the voltage conversion region comprises a floating diffusion region to which the charge is transferred from the photodiode element and which is converted to a voltage by a capacitor associated with the floating diffusion region.

The in-pixel amplifier may comprise an active amplifier forming part of a double sampling arrangement. The double sampling arrangement comprises an input sampling capacitor connected to the pixel core and to the active amplifier, and a feedback capacitor connected between an input and an output of the active amplifier.

In one embodiment, the at least one control transistor comprises a reset gate for resetting the photodiode element. In this case, the pixel core architecture does not include a transfer gate.

In another embodiment, the at least one control transistor comprises a transfer gate for charge from the photodiode element to the voltage conversion region and a reset gate for resetting the photodiode element. In this case, the pixel architecture may comprise a pinned-photodiode pixel architecture.

In accordance with another aspect of the present disclosure, there is provided an imaging sensor comprising an array of pixels, each having a pixel architecture as described above.

In one embodiment, the imaging sensor may comprise a global shutter imaging sensor.

BRIEF DESCRIPTION OF THE DRAWINGS

For a better understanding of the present disclosure, reference will now be made, by way of example, to the accompanying drawings in which.

DETAILED DESCRIPTION OF CERTAIN ILLUSTRATIVE EMBODIMENTS

Figure 1:
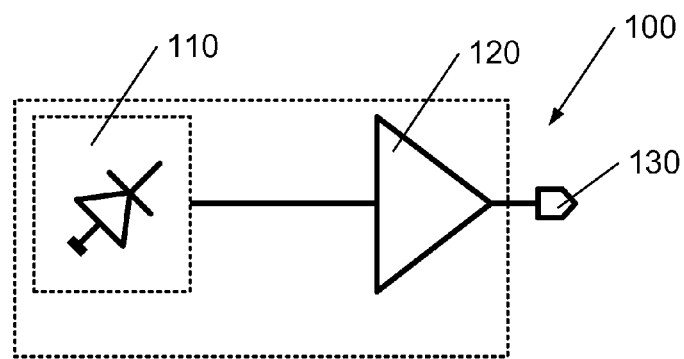
FIG. 1 illustrates a schematic representation of a conventional pixel architecture having a pixel core and a column buffer.

The present disclosure will be described with respect to particular embodiments and with reference to certain drawings but the invention is not limited thereto. The drawings described are only schematic and are non-limiting. In the drawings, the size of some of the elements may be exaggerated and not drawn on scale for illustrative purposes.

The terms "upper," "lower," "top," "bottom," "vertical" and "horizontal" as used herein refer to the orientation of the embodiments illustrated in drawings and is not intended to be limiting to a specific configuration.

Reference numerals that refer to the same components in each of the figures bear the same reference numerals in the following description.

Imaging sensors comprise an array of pixels where each pixel comprises a pixel architecture, which in contemporary implementations, comprises of a 4-transistor (pixel) architecture or a 4T pixel circuit (or simply a 4T pixel), and typically, includes a pinned photodiode connected to an output by means of a transfer gate, a floating diffusing region, a readout gate and a reset gate. Although operation for a pinned-photodiode pixel is described below, it will readily be appreciated that other pixel architectures, such as, a pixel architecture without a transfer gate, can also be implemented in imaging sensors. Naturally, the present disclosure is also applicable to other pixel architectures (including pixel core architectures).

The floating diffusion region is implemented by a storage capacitor, and, the transfer gate, the readout gate and the reset gate are implemented by transistors. During an integration period, that is, a capture period or a frame, the transfer gate is open allowing electrons (generated in accordance with the incident light level) to be collected in the photodiode. At the end of the integration period, the transfer gate is closed so that the generated electrons are completely transferred into the floating diffusion region and are converted to a voltage using a floating diffusion or voltage conversion capacitor. The voltage is read out when the readout gate is closed to provide the pixel output. The pixel is reset by closure of the reset gate and opening of the transfer and readout gates.

In a typical 3T or pinned photodiode (PPD) 4T pixel structure or architecture, electrons generated by the pixel photodiode are converted into voltage using the storage capacitor in the floating diffusion region as described above. The gain is determined from the equation:

$$V = \frac{Q}{C} = n\frac{q}{C} = n \cdot CVF$$

where V is the voltage, Q is the charge in coulombs, C is the capacitance of the conversion capacitor, q is elementary charge, n is the number of electrons, and CVF is the conversion factor expressed in (micro)volt per electron. CVF is the measure for the voltage generated by one signal electron and is inversely proportional to the capacitance value of the conversion capacitor C.

For low noise, a large conversion factor (CVF) is required. A large CVF reduces the impact of the typical dominant noise sources, being either the source follower or subsequent elements in the readout chain. Those noise sources are generated in the voltage domain, are expressed in volts, and, are, in first instance, not related to the CVF. However, their input related noise contribution expressed in electrons, scales down directly with CVF. To conclude, low noise means a large CVF which means a conversion capacitor with a low or small capacitance value needs to be provided.

Typically, the reset (RST) transistor in a 4T pixel circuit is a transistor with zero or negative threshold voltage. Such a transistor is referred to as a depletion-mode N-channel metal oxide semiconductor (NMOS) device. Depletion-mode NMOS devices can be used as the load of an NMOS amplifier to replace a P-channel metal oxide semiconductor (PMOS) load transistor in an in-pixel amplifier. This has the advantage that quantum efficiency is not degraded due to the presence of a PMOS device within the in-pixel amplifier.

Depletion-mode devices have been used in the past in non-imaging applications such as logic devices, when complementary MOS (CMOS) processes were not yet available. These devices were generally replaced when complementary devices became available, using NMOS and PMOS devices to generate logic gates and amplifiers, with better performance.

As depletion mode devices are already present in pinned photodiode pixel architectures, that is, the RST gate is typically a depletion-mode device, and, as the use of PMOS devices is undesirable inside a pixel, the present disclosure utilizes a depletion-mode NMOS load in an in-pixel amplifier.

Moreover, as a depletion-mode device is available inside the pixel as the RST gate, no additional masks are needed for the process and the depletion-mode NMOS load can be implemented at no additional process cost. However, a depletion-mode NMOS load or device may be optimized for optimal behavior in an in-pixel amplifier implementation.

Referring initially to FIG. 1, a conventional pixel circuit or pixel architecture 100 is shown which comprises a pixel core 110 and a column buffer 120, the column buffer 120 being connected to a column output 130. The pixel core 110 comprises a pixel photodiode connected to an output by means of a transfer gate, a floating diffusing region, a readout gate and a reset gate (not shown). These components within the pixel core 110 are not shown in this figure but are described in more detail below with reference to FIG. 4.

Figure 2:
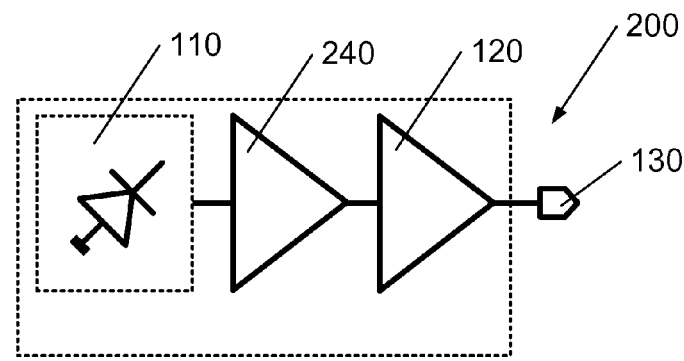
FIG. 2 is similar to FIG. 1 but includes an amplifier with a gain of greater than 1 within the pixel architecture.

FIG. 2 is similar to FIG. 1 but illustrates a pixel circuit or pixel architecture 200 with an in-pixel amplifier 240 located between the pixel core 110 and the column buffer 120 in accordance with the present disclosure. The in-pixel amplifier 240 has a gain greater than one so that the output from the pixel core 110 can be amplified as soon as possible after it has been read out from the pixel core 110. The implementation of such an in-pixel amplifier is described in more detail with reference to FIG. 4 below.

Figure 3:
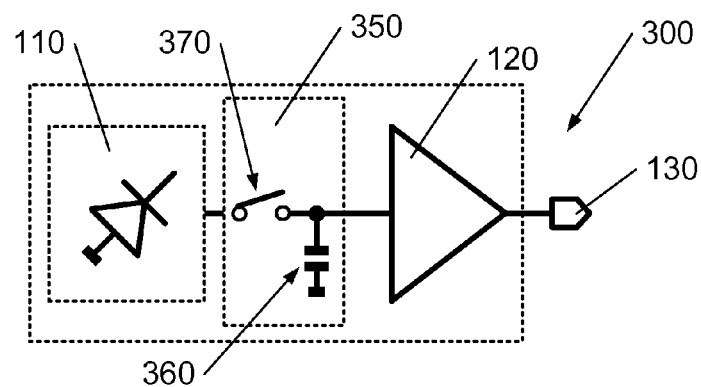
FIG. 3 is similar to FIG. 1 but includes a storage arrangement.

Apart from having improved quantum efficiency and fill factor performance in an in-pixel amplifier, such an in-pixel amplifier can be used in global shutter imaging sensors in which signals need to be stored before being read out. Such an arrangement is shown in FIG. 3.

The term "global shutter imaging sensor" as used herein refers to an imaging sensor in which signals from each pixel in the imaging array are stored within the pixel until it is required that the signals are read out together, that is, globally for the entire imaging array.

The term "global shutter arrangement" as used herein refers to a storage arrangement which enables the signals to be stored and then read out when required.

The term "global shutter operation" as used herein refers to the process of reading out the stored signals in the global shutter arrangement.

FIG. 3 is similar to FIG. 1 but illustrates a pixel circuit 300 which includes a storage arrangement 350 located between the pixel core 110 and the column buffer 120. As shown, this storage arrangement 350 includes a storage capacitor 360 and a switch 370 which forms part of a global shutter arrangement for an imaging sensor (not shown), the imaging sensor comprising an array (not shown) of pixel circuits 300. The output from the pixel core 110 is stored in the capacitor 360 when the switch 370 is closed until the global shutter arrangement is operated to open the switch 370 and to allow the output stored on the capacitor 360 to be transferred to the column buffer 120. As described above, if the output from the pixel circuit is small, the storage capacitor also tends to be small resulting in poor signal-to-noise performance.

The requirement to store weak or low pixel signals inside the pixel itself for global shutter operation results in increased noise if only a small storage capacitor can be provided inside a small pixel.

The present disclosure addresses the problem of providing an in-pixel amplifier with gain greater than one, and, the problem of providing in-pixel storage for global shutter imaging sensors by implementing a depletion-mode amplifier as the in-pixel amplifier.

Figure 4:
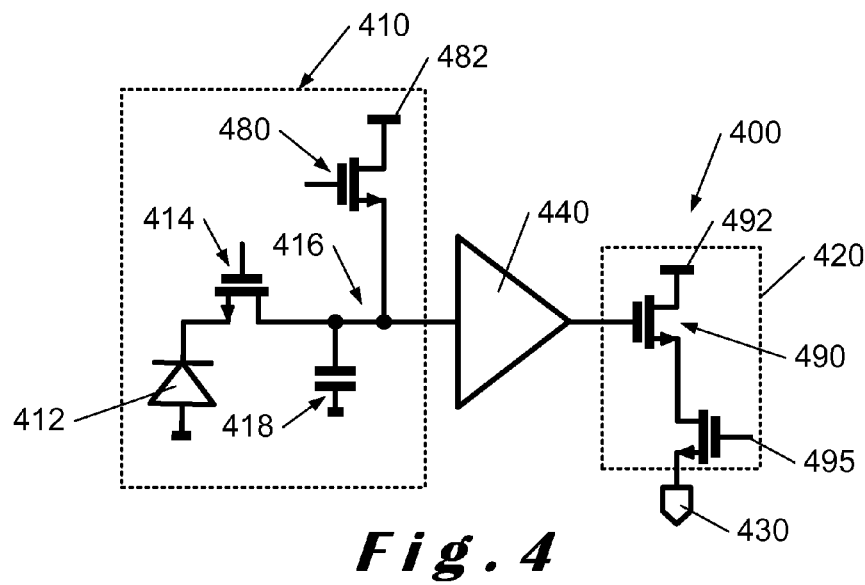
FIG. 4 illustrates a pixel architecture having an in-pixel amplifier in accordance with the present disclosure.

Referring now to FIG. 4, one embodiment of a pixel circuit 400 including an in-pixel amplifier is shown in more detail. The pixel circuit comprises a pixel core 410, which is identical to the pixel core 110 described above with reference to FIGS. 1 and 2, and an in-pixel amplifier 440 which is identical to the in-pixel amplifier 240 shown in FIG. 2. Column buffer 420 is identical to column buffer 120 shown in FIGS. 1 and 2 and is implemented by a read out gate or read out transistor as described in more detail below. The column buffer 420 is connected to an output at 430 as shown.

The pixel core 410 comprises a pixel photodiode 412 connected to a transfer (TX) gate or TX transistor 414. The TX gate or TX transistor 414 is closed to transfer electrons produced by the pixel photodiode 412 after integration to a floating diffusing (FD) region 416. The FD region 416 includes a capacitor 418 for converting the electrons to a voltage as described above. A reset (RST) gate or RST transistor 480 is provided which is connected to a voltage supply 482 and to the FD region 416. The FD region 416 is also connected to the in-pixel amplifier 440 for in-pixel amplification of the voltage resulting from the conversion of the electrons at the FD capacitor 418. The in-pixel amplifier 440 will be described in more detail with reference to FIG. 5 below.

The column buffer 420 includes a readout gate or readout transistor 490 as shown and which is connected to a voltage supply 492. Although voltage supply 492 is shown as being different to voltage supply 482, it will readily be appreciated that the voltage supply 492 may be the same as voltage supply 482 using the same physical interconnecting line in the pixel array (not shown) of the imaging sensor (also not shown). In addition, the column buffer 420 includes a row select (RS) gate or RS transistor 495 which enables the read out process when the RS gate or RS transistor is closed.

The term "photodiode" as used herein refers to a diode device which provides an output signal in accordance with either incident light (photons), electrons or other physical sources that result in generated electron-hole pairs inside the substrate of the diode device. In each case, the photodiode detects electrons, and, during each integration period, integrates a charge in accordance with the electrons detected.

Figure 5:
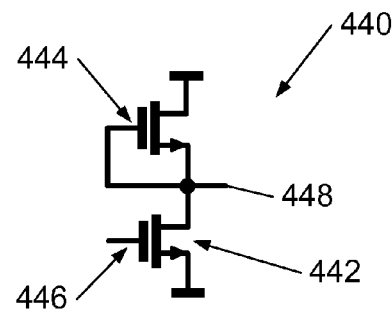
FIG. 5 illustrates an example of a depletion-mode amplifier using an NMOS amplifier and depletion-mode NMOS load for use in the pixel architecture of FIG. 4.

Turning now to FIG. 5, an example of the in-pixel amplifier 440 is shown. In this embodiment, the in-pixel amplifier 440 is implemented by a depletion-mode amplifier comprising an NMOS amplifier 442 with a depletion-mode NMOS load 444. The NMOS amplifier 442 has an input 446 connected to the pixel core 410 and an output 448 which is connected to the column buffer 420, and more particularly, to the readout gate or readout transistor 490. As described above, the depletion-mode NMOS load 444 replaces a conventional PMOS device which reduces quantum efficiency and fill factor.

Figure 6:
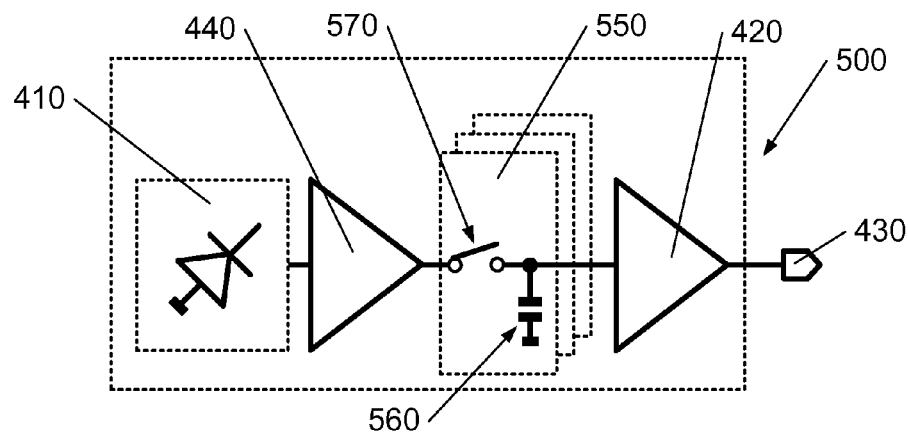
FIG. 6 is a schematic representation of a pixel architecture incorporating a depletion-mode amplifier for in-pixel storage for global shutter imaging sensors.

By having an in-pixel amplifier 440 that can be used for amplification of the output from the pixel core 410 inside the pixel circuit or architecture 400, a larger output value is obtained which can be stored inside the pixel circuit or pixel architecture on a capacitor having a low capacitance value with improved signal-to-noise performance, and, hence, improve the quality of stored signals for global shutter operation as shown in FIG. 6.

FIG. 6 is a schematic illustration of a pixel circuit or pixel architecture 500 which includes a pixel core 410, an in-pixel amplifier 440 and a column buffer 420 connected to an output 430 as shown in FIG. 4. At least one storage arrangement 550 similar to the storage arrangement 350 shown in FIG. 3 is positioned between the in-pixel amplifier 440 and the column buffer 420. As before, each storage arrangement 550 includes a storage capacitor 560 and a switch 570 which forms part of a global shutter arrangement for an imaging sensor (not shown), the imaging sensor comprising an array (not shown) of pixel circuits or pixel architectures 500.

As shown in FIG. 6, more than one storage arrangement may be provided within each pixel circuit so that more than one frame may be stored within the pixel at any one time, each storage arrangement being arranged in parallel and connected to, and between, the in-pixel amplifier and the column buffer. Each storage arrangement is individually controlled to be selected for storing captured frames and for reading out the stored values.

Figure 7:
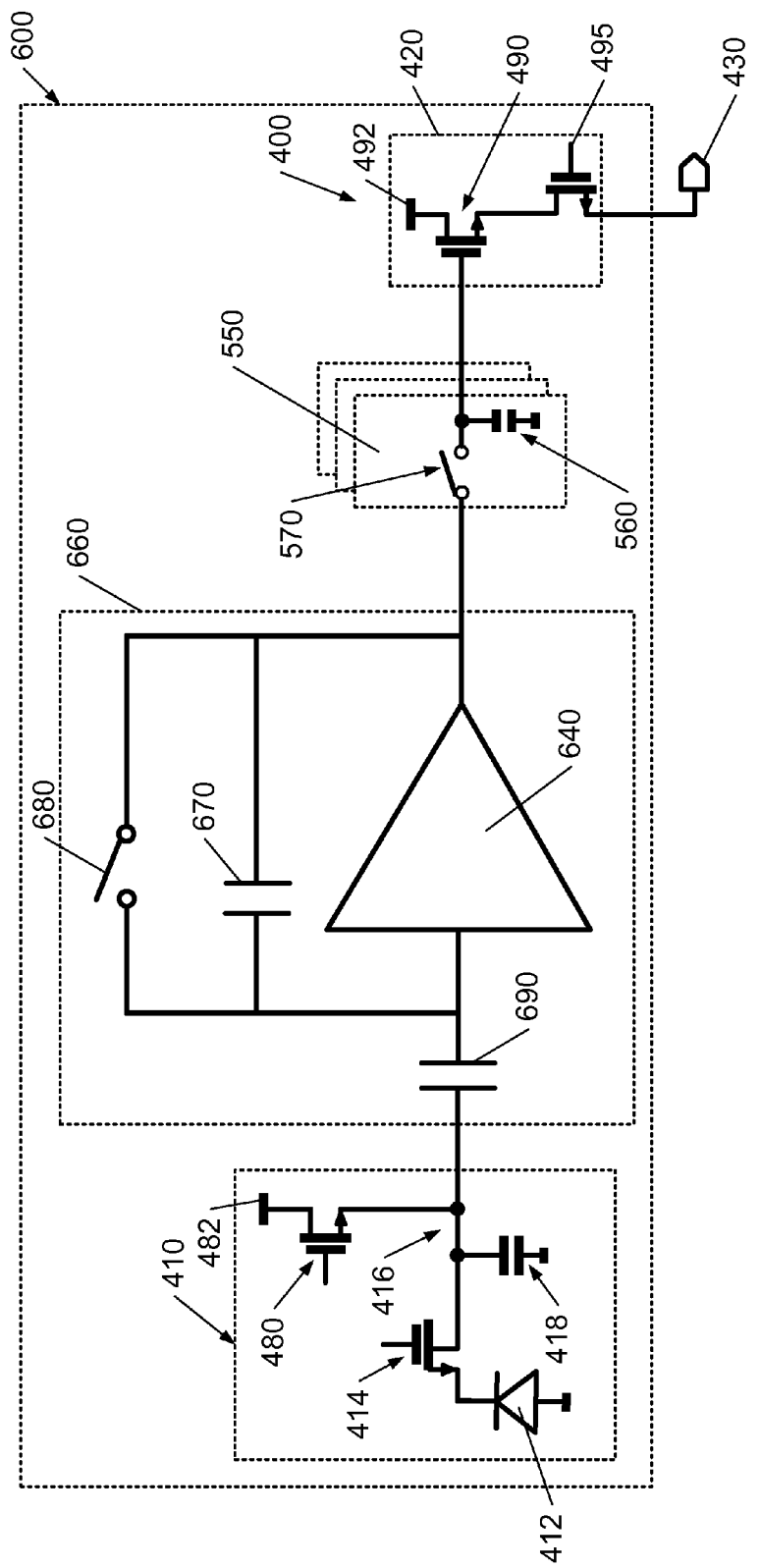
FIG. 7 illustrates a correlated doubling sampling architecture incorporating an in-pixel amplifier in accordance with the present disclosure.

FIG. 7 illustrates a schematic illustration of a pixel circuit or pixel architecture 600 in which correlated double sampling (CDS) utilizing an in-pixel amplifier in accordance with the present disclosure can be implemented. The pixel circuit or pixel architecture 600 comprises a pixel core 410 and a column buffer 420 connected to an output 430 as shown in FIG. 4. An in-pixel amplifier 640 is provided as part of a CDS arrangement 660, the CDS arrangement being connected to, and between, the pixel core 410 and the storage arrangement 550 as shown in FIG. 6. The storage arrangement 550 is connected to the column buffer 420 as shown. The CDS arrangement 660 comprises the in-pixel amplifier 640 connected in parallel with a feedback capacitor 670 and a switch 680. A sampling capacitor 690 is provided in series with CDS arrangement 660.

During a reset phase where the RST gate or RST transistor 480 (FIG. 4) is closed, the switch 680 is also closed and the RST value can be determined and stored on sampling capacitor 690. During a transfer phase where the TX gate or TX transistor 414 (FIG. 4) is closed, the switch 680 is open so that the difference charge signal-reset value from the pixel photodiode 412 is transferred to the feedback capacitor 670. The difference between the RST value and the signal value is then stored in the storage arrangement 550. This has the advantage that an output signal can be stored which is compensated for the RST value with no need for additional processing. In addition, suitable selection of the capacitance values for the feedback capacitor 670 and the sampling capacitor 690 provide the amplification of the compensated output signal, for example, in accordance with the ratio of the capacitance value of the sampling capacitor to that of the feedback capacitor.

It will be appreciated that the in-pixel amplifier of the present disclosure can also be implemented in other pixel architectures where there is no TX gate or TX transistor.

The in-pixel amplifier of the present disclosure is of particular use in high-speed cameras which are capable of reproducing slow-motion video of fast moving actions that cannot be seen with the naked eye. Frame rates in excess of 1000 frames per second are already available but there tends to be a trade-off between image capture rate and resolution. By having in-pixel memory that temporarily accumulates signal charges from its associated photodiode, the signal charges can be acquired at high speeds and read out at lower speeds so that the capture and read out effectively become independent. Capture frame rates in excess of $10^6$ frames per second are envisaged.

Whilst the present disclosure has been described in relation to a specific embodiment and for specific uses, it will be appreciated that other embodiments of a depletion-mode amplifier can be used for an in-pixel amplifier.

What is claimed is:

1. A pixel architecture comprising:
    a photodiode element operable for generating a signal;
    an in-pixel amplifier configured to amplify the generated signal and having a gain greater than one, the in-pixel amplifier comprising an NMOS amplifier with a depletion-mode NMOS load transistor, wherein the depletion-mode NMOS load transistor functions as a load of the NMOS amplifier;
    an output for outputting the amplified signal.

2. The pixel architecture according to claim 1, further comprising at least one storage element connected to the in-pixel amplifier for storing the amplified signal.

3. The pixel architecture according to claim 1, further comprising a plurality of storage elements connected to the in-pixel amplifier for storing the amplified signal, wherein one of the storage elements is provided for storing the amplified signal for each frame of a plurality of imaging frames, the storage elements being connected in parallel to the in-pixel amplifier and to the output.

4. The pixel architecture according to claim 1, further comprising a column buffer connected to the output, the column buffer including at least one transistor for reading out signals for the output.

5. The pixel architecture according to claim 1, wherein the photodiode element forms part of a pixel core, the pixel core including a floating diffusion region, a conversion capacitor, and at least one control transistor, the output from the pixel core forming an input for the in-pixel amplifier.

6. The pixel architecture according to claim 5, wherein the in-pixel amplifier comprises an active amplifier forming part of a double sampling arrangement.

7. The pixel architecture according to claim 6, wherein the double sampling arrangement comprises an input sampling capacitor connected to the pixel core and to the active amplifier, and a feedback capacitor connected between an input and an output of the active amplifier.

8. The pixel architecture according to claim 5, wherein the at least one control transistor comprises a reset gate for resetting the photodiode element.

9. The pixel architecture according to claim 5, wherein the at least one control transistor comprises a transfer gate for transferring the charge from the photodiode element to the floating diffusion region and a reset gate for resetting the photodiode element.

10. An imaging sensor comprising a plurality of pixels having a pixel architecture according to claim 1.

11. The imaging sensor according to claim 10, comprising a global shutter imaging sensor.

* * * * *